United States Patent [19]

Rihm

[11] 3,951,516
[45] Apr. 20, 1976

[54] MOVABLE TWO TONE BICYCLE REFLECTOR AND ITS SUPPORT

[76] Inventor: Peter L. Rihm, 642 N. Cherry St., Celina, Ohio 45822

[22] Filed: Sept. 13, 1974

[21] Appl. No.: 505,859

[52] U.S. Cl................................. 350/99; 350/109
[51] Int. Cl.².......................................... G02B 5/12
[58] Field of Search .............. 350/97, 99, 100, 107, 350/108; 301/37 SA

[56] References Cited
UNITED STATES PATENTS

| | | | |
|---|---|---|---|
| 3,658,408 | 4/1972 | Santovi | 350/97 |
| 3,694,051 | 9/1972 | Dian | 350/97 |
| 3,758,190 | 9/1973 | Douglas | 350/99 X |
| 3,768,433 | 10/1973 | Dian et al. | 350/97 X |

*Primary Examiner*—John K. Corbin
*Assistant Examiner*—B. Wm. de los Reyes

[57] ABSTRACT

A two-tone movable safety bicycle reflector having two contrasting reflective surfaces and bracket for selectively supporting the reflector in selected positions on a bicycle.

3 Claims, 6 Drawing Figures

MOVABLE TWO TONE BICYCLE REFLECTOR AND ITS SUPPORT

BACKGROUND, SUMMARY, AND OBJECTS OF THE INVENTION

The universal interest in cycling has led to the use of a large number of bicycles on rural roads and city streets. This, together with present day automobile traffic, presents many hazards due to inadequate warning to the automobile operator of the bicycle rider on the road. A good warning device must not only be located so as to be clearly visible but must also present sufficient contrast between its own various elements and with the bicycle and rider. Mandatory safety standards are being adopted by the regulatory agencies calling for large and more visible reflectors.

An object of the invention is to provide a reflector having a frame of one reflective material and a body of a different material in order to provide a contrast between the two to add visibility to the bicycle and rider.

Another object is to provide a simple support for the reflector so that it may be attached in a selected manner on a selected portion of the bicycle.

Another object is to provide a support so located on the bicycle as to provide the means for securing to it a large reflector (to meet requirements) yet not interfere with the operation of the bicycle.

Another object is to provide a reflector and a securing means to secure the reflector to any one of several brackets so that the brackets are readily interchangeable.

Other objects, features, and advantages of the invention will be readily apparent from the following description of a preferred embodiment thereof, taken in conjunction with the accompanying drawing, although variations and modifications may be effected without departing from the spirit and scope of the novel concepts of the disclosure.

DESCRIPTION OF PREFERRED EMBODIMENT OF INVENTION

Figure 1:
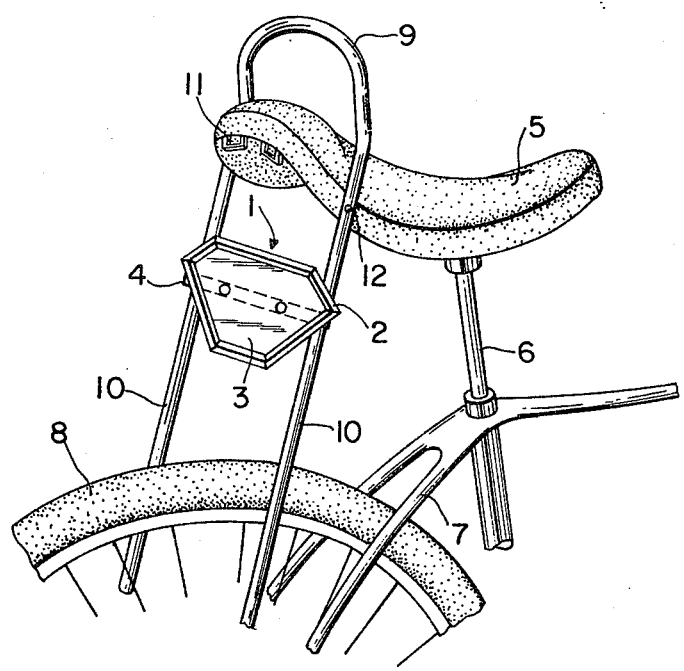
FIG. 1 is a diagrammatic view of a bicycle seat and its support illustrating the bicycle reflector supported by using one form of bracket.

In the preferred embodiment of the invention illustrated in FIGS. 1, 2, 3, and 6, I have shown the reflector 1 with its frame 2 and body 3 supported on a bicycle by means of bracket 4. FIG. 1 shows in diagrammatic form a bicycle seat 5, post 6, portions of bicycle frame 7, wheel 8, seat support 9, with its two parallel legs 10, and the bicycle reflector supported on parallel legs 10 by means of adjustable bracket 4. Since bicycles are so well known it is not believed necessary to further illustrate the details of the bicycle itself. Many styles of seats are now available but almost all now have a post for support and slotted openings 11 in the rear for carrying tool kits or accessories. Many are further supported on the parallel legs by bolts 12.

To be effective a bicycle reflector should have two essential characteristics, namely: (1) it should itself present sharp contrasts between its various elements, and (2) it should have some degree of freedom with relation to the bicycle. Further, to be practical, it should present several forms of attachment to the bicycle in order to be adaptable to various styles of bicycles and to selected portions of the bicycle.

To show contrast between the elements of the reflector, its frame 2 and body 3 are made, at least in part, of different materials having different appearances. It may, of course, be of any shape but the illustrated form has proven to be both strong and easily recognizable on a bicycle. The body 3 is attached to the frame 2 by any appropriate means, or they may be integral, and has sufficient rigidity and strength to support the entire reflector on its bracket. The frame and body may be made of any of a great variety of available materials. They may each be made of contrasting reflective, luminous, or fluorescent plastic materials or of painted or coated metals or plastics so as to be reflective, luminous, or fluorescent. The important feature is to have a sharp contrast between body and frame, such as for example, color, variation in reflective intensities, surface characteristics, etc. Even when stationary the reflector can readily be seen in daylight or artificial light. When the material is luminous, it can be identified in the dark. The frame may have an enlarged area in order to provide a space for indicia, as for example, the bicycle owner's name.

Figure 4:
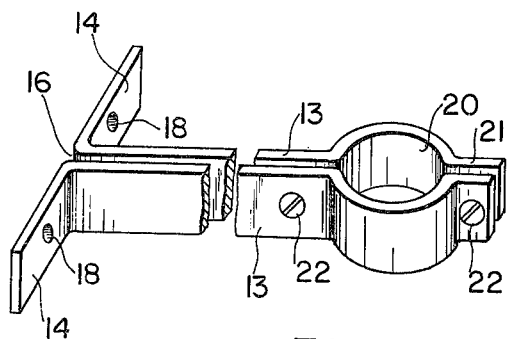
FIG. 4 is a view of another form of bracket for the reflector.
Figure 5:
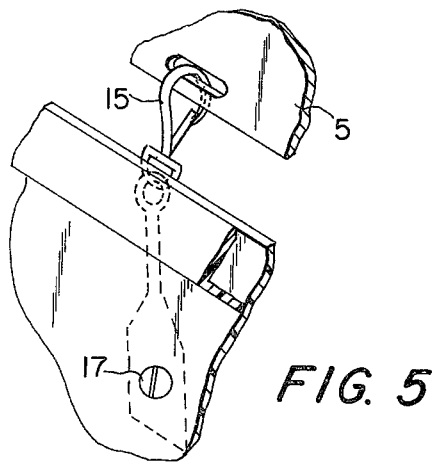
FIG. 5 is a view of a third form of bracket for the reflector.
Figure 6:
FIG. 6 is a sectional view of the frame and body looking substantially along line 6—6 of FIG. 2.

To further add to its effectiveness the support may be made to permit the reflector to move with respect to the bicycle. This may be accomplished by making the supports of FIGS. 2 and 4 of resilient material to permit some vibration when the bicycle is in motion or it may be supported to swing as shown in FIG. 5.

Each of the three brackets shown may be secured to the reflector by identical attaching means in order to give the user a choice of where and how to attach the reflector. In fact, it is possible to furnish a single reflector in a kit with the three brackets at a very small additional cost over the reflector and a single bracket. FIG. 1 illustrates the reflector supported on legs 10. However, by using the swinging snap hooks 15 shown in FIG. 5 the reflector may be hung in slotted openings 11. Or the reflector may be supported on post 6 by the use of bracket 16 shown in FIG. 4.

Bracket 16 is made of two similar pieces located back to back. Each piece has a flat central portion 13, a right angled flange 14, a semi-circular curved portion 20, and a flat end portion 21. The two pieces are secured together by any appropriate means 22, 22 with the bicycle post clamped between the two semi-circular curved portions. An up and down vibration of the reflector may be provided by locating central portions 13 in a horizontal direction, as for example, by twisting them with respect to the semi-circular curved portions 20. Bracket 16 could also be used to fasten the reflector in front of the rider, as for example, on or below the handle bars. It might also be secured to one of the parallel legs 10 or to any tubular element of a bicycle having sufficient clearance with the other elements of the bicycle and with the bicycle rider.

Figure 2:
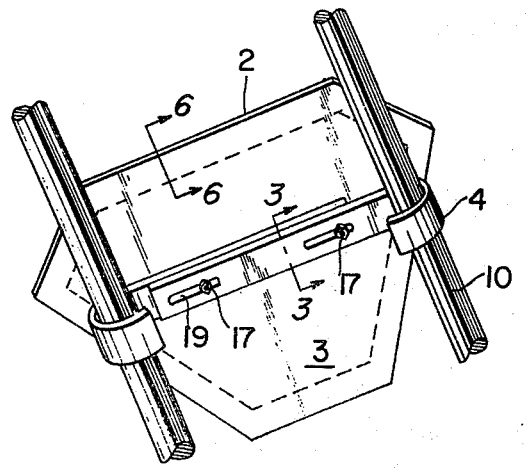
FIG. 2 is a rear view of the reflector and bracket of FIG. 1 secured to the bicycle.
Figure 3:
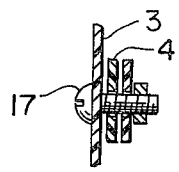
FIG. 3 is a sectional view looking substantially along line 3—3 of FIG. 2.

It should be emphasized that each form of the bracket may be secured to the reflector by the same means in order to add a large degree of universality to the reflector. I have shown only one such means. Bolts 17 are shown in FIGS. 2, 3, and 5, and bolt receiving opening 18 in FIG. 4. By the use of only two such bolts any of the three brackets may be used to attach the reflector to the bicycle, as illustrated.

The bracket 4 may be made of a single piece to fit one particular size bicycle. It may be made of stiff but bendable material, or it may be made of two pieces, each sliding with respect to the other, as illustrated in FIG. 3. In the latter case slots 19 may be provided in each piece to permit the pieces to slide in order to adjust to various size bicycles.

It should be noted that each form of bracket permits the reflector to be supported on the bicycle so that it is behind the legs 10. This permits a great variation in the size of the reflector since it is confronted with no obstructions to limit its size. This is of great importance because of pending legislation seeking to define the minimum size of bicycle reflectors. In addition to the three brackets which have been described, other forms of movable support (not shown) may be used, as for example, a coil spring secured to the reflector and supported on the bicycle.

I claim:

1. A bicycle reflector in combination with a bracket for supporting the reflector on a conventional bicycle, and a securing means to secure the bracket to the reflector,
    said reflector comprising a flat planar body, of a plastic material having a luminous reflective surface, and a rigid frame, of a plastic material different from the material of said body and having a luminous reflective surface different from and contrasting visually with the reflective surface of the body in order to increase the visibility of the reflector to an observer, said frame surrounding said body and having a flat planar back coinciding with the plane of the body and flat planar sides projecting forwardly from said back forming inside acute angles with said back so that their planes intersect in front of said body,
    said securing means being fastened to said body and to said bracket, and
    said bracket having support means for attachment to the two parallel legs of a conventional bicycle seat support,
    said bracket spanning the two parallel legs and comprising two resilient flat horizontal elements slidable with respect to each other, each element having one curved end to partially encompass one of the respective legs, and the elements having matching slots to receive the securing means to thereby secure the bracket to the reflector and resiliently and adjustably support the reflector on the bicycle to permit the reflector to vibrate and thereby to change the angle between the reflector and the line of vision from an observer to said reflector in order to further increase the visibility of the reflector,
    said reflector being supportable behind the said parallel legs and extending laterally beyond each of the legs.

2. A bicycle reflector in combination with a bracket for supporting the reflector on a conventional bicycle, and a securing means to secure the bracket to the reflector,
    said reflector comprising a flat planar body, of a plastic material having a luminous reflective surface, and a rigid frame, of a plastic material different from the material of said body and having a luminous reflective surface different from and contrasting visually with the reflective surface of the body in order to increase the visibility of the reflector to an observer, said frame surrounding said body and having a flat planar back coinciding with the plane of the body and flat planar sides projecting forwardly from said back forming inside acute angles with said back so that their planes intersect in front of said body.
    said securing means being fastened to said body and to said bracket, and
    said bracket comprising two resilient matching pieces, each piece having a flat central portion, a right angled flange at one end, a semi-circular curve near the other end, and a flat portion beyond the curve at the other end and lying in the plane of the central portion, said flange having an opening to receive one of the reflector securing means, and said flat portions each having fastening means near the curve to secure the two matching pieces together to clamp the pieces around a selected tubular element of the bicycle to permit the reflector to vibrate and thereby to change the angle between the reflector and the line of vision from an observer to said reflector in order to further increase the visibility of the reflector.

3. A bicycle reflector in combination with a bracket for supporting the reflector on a conventional bicycle, and a securing means to secure the bracket to the reflector,
    said reflector comprising a flat planar body having a reflective surface surrounded by a rigid frame, said frame having a flat planar back coinciding with the plane of the body and flat planar sides projecting forwardly from said back forming inside acute angles with said back so that their planes intersect in front of said body, said frame having a reflective surface different from and contrasting visually with the reflective surface of the body in order to increase the visibility of the reflector to an observer, and said reflector being supportable behind the two parallel legs of a conventional bicycle seat support and having portions extending laterally beyond each of said respective legs,
    said securing means being fastened to said body and to said bracket, and
    said bracket comprising a portion secured to the securing means and snap hooks fitting into the conventional slotted openings on the back of a conventional bicycle seat to permit swinging movement of the reflector behind the seat whereby the portions extending laterally are restrained by the legs against swinging forwardly beyond said legs and whereby the swinging and striking of said reflector against said legs causes further visibility to the observer.

* * * * *